Patented July 23, 1935

2,008,953

UNITED STATES PATENT OFFICE 2,008,953

GAS PURIFYING MASS

Fritz Giller and Ludwig Friederici, Ludwigshafen-on-the-Rhine, Germany, assignors to I. G. Farbenindustrie Aktiengesellschaft, Frankfort-on-the-Main, Germany No Drawing. Application August 24, 1932, Serial No. 630,239. In Germany August 26, 1931

9 Claims. (Cl. 252—2.5)

The present invention relates to new masses for the dry purification of gases and to a process for making such masses.

In the usual desulphurization of coke oven and illuminating gas or other gases contaminated with sulphur with the employment of masses containing hydrated iron oxide, chambers having large surfaces are required because the purifying masses, by reason of the high resistance which they offer to the passage of gas, can only be employed when spread out in thin layers. Attempts have been made to avoid the said objection by forming the masses into briquettes but in this case the active surface is greatly reduced. If loosening agents, such as sawdust, be added to the masses prior to briquetting in order to increase the surface, products of unsatisfactory mechanical strength are obtained.

We have now found that all the said objections are avoided and an excellent mass for the purification of gases having a large surface and great mechanical strength is obtained by intimately mixing masses comprising reactive, hydrated iron oxide with hydraulic binding agents, such as cement, as for example magnesia cement, or lime, gypsum or mixtures of several such substances in the presence of alkali metal bicarbonate (including ammonium bicarbonate) and a little water, the whole then being heated. During the heating, as for example in a warming chamber at from 40° to 50° C. for some time, the bicarbonate is decomposed whereby fine pores are formed in the mass which do not interfere with a complete setting of the cement or the like. From 0.5 to 1 per cent of bicarbonate, calculated with reference to the whole mass, is usually sufficient, because with larger amounts there is again the risk that large cavities are formed in the mass. It is preferable to employ an amount of water sufficient to produce a thick paste. The moist mass may be introduced into any desired moulds, or it may be divided into pieces of the desired size before or after the heating.

The new masses have a great mechanical strength, so that they do not crumble away even when arranged in containers several meters in height. They are resistant against water, solvents for sulphur, and steam at temperatures up to about 100° C.

The following example will further illustrate the nature of this invention but the invention is not restricted to this example. The parts are by weight.

Example 75 parts of hydrated iron oxide, such as is obtained as a residue from the decomposition of bauxite, are well mixed with 25 parts of cement and 0.5 part of ammonium bicarbonate and then stirred to a thick paste with a little water. The paste is poured into flat moulds and then heated for about a quarter of an hour at 40° C. in a warming chamber. The mass is then cut into pieces of the desired size. After being allowed to stand for some time the pieces become thoroughly hardened and may then be employed. They may be used for long periods of time for the desulphurization of gases and withstand many extractions, as for example with carbon disulphide.

What we claim is:—

1. The process of producing a gas purification mass in lump form which comprises making hydrated iron oxide, magnesia cement and an alkali metal bicarbonate into an aqueous paste, heating said paste to decompose the bicarbonate and allowing the cement to set.

2. The process of producing a gas purification mass in lump form which comprises making hydrated iron oxide, cement and an alkali metal bicarbonate into an aqueous paste, heating said paste to decompose the bicarbonate and allowing the cement to set.

3. The process of producing a gas purification mass in lump form which comprises making hydrated iron oxide, a cement and ammonium bicarbonate into an aqueous paste, heating said paste to decompose the bicarbonate and allowing the cement to set.

4. The process of producing a gas purification mass in lump form which comprises making hydrated iron oxide, a cement and from 0.5 to 1 per cent, by weight of the whole mass, of ammonium bicarbonate into an aqueous paste, heating said paste to decompose the bicarbonte and allowing the cement to set.

5. The process of producing a gas purification mass in lump form which comprises making hydrated iron oxide, magnesia cement and from 0.5 to 1 per cent, by weight of the whole mass, of ammonium bicarbonate into an aqueous paste, heating said paste to between 40° and 60° C. and allowing the cement to set.

6. A gas purification mass in lump form comprising hydrated iron oxide and a set cement, the whole mass being highly porous and of cellular structure, resistant against water, solvents for sulphur, and steam at temperatures up to about 100° C., and not crumbling away even when arranged in containers several meters in height.

7. The process of producing a gas purification mass in lump form which comprises making about 3 parts of hydrated iron oxide, about 1 part cement and up to about 1 per cent of the total mass of an alkali metal bicarbonate into an aqueous paste, heating said paste to decompose the bicarbonate and allowing the cement to set.

8. A gas purification mass in lump form comprising about 3 parts of hydrated iron oxide and about 1 part of a set cement, the whole mass being highly porous and of cellular structure, resistant against water, solvents for sulphur, and steam at temperatures up to about 100° C. and stable against crumbling when arranged in heaps several meters in height.

9. A gas purification mass in lump form comprising hydrated iron oxide and a set magnesia cement, the whole mass being highly porous and of cellular structure, resistant against water, solvents for sulphur, and steam at temperatures up to about 100° C., and stable against crumbling when arranged in heaps several meters in height.

FRITZ GILLER.
LUDWIG FRIEDERICI.